United States Patent
He et al.

(10) Patent No.: US 12,260,673 B1
(45) Date of Patent: Mar. 25, 2025

(54) FACIAL ACUPOINT LOCATING METHOD, ACUPUNCTURE METHOD, ACUPUNCTURE ROBOT AND STORAGE MEDIUM

(71) Applicant: JIANGHAN UNIVERSITY, Hubei (CN)

(72) Inventors: Qiang He, Hubei (CN); Yifan Deng, Hubei (CN); Hongxing Zhang, Hubei (CN); Qian Tu, Hubei (CN)

(73) Assignee: JIANGHAN UNIVERSITY, Wuhan (CN)

(*) Notice: Subject to any disclaimer, the term of this patent is extended or adjusted under 35 U.S.C. 154(b) by 0 days.

(21) Appl. No.: 18/754,097

(22) Filed: Jun. 25, 2024

(30) Foreign Application Priority Data

Jan. 25, 2024 (CN) .......................... 202410106300.1

(51) Int. Cl.
*G06K 9/00* (2022.01)
*G05D 1/60* (2024.01)
(Continued)

(52) U.S. Cl.
CPC .............. *G06V 40/171* (2022.01); *G05D 1/60* (2024.01); *G06T 7/10* (2017.01); *G06T 7/50* (2017.01);
(Continued)

(58) Field of Classification Search
CPC ...... G06V 40/171; G06V 10/82; G06V 10/26; G06V 10/80; G06T 7/10; G06T 7/50;
(Continued)

(56) References Cited

U.S. PATENT DOCUMENTS

2005/0154317 A1  7/2005  Shin et al.
2020/0126297 A1  4/2020  Tian et al.
(Continued)

FOREIGN PATENT DOCUMENTS

CN  107137225 A  9/2017
CN  110464633 A  11/2019
(Continued)

OTHER PUBLICATIONS

Yuan, Zijian, et al. "YOLOv8-ACU: improved YOLOv8-pose for facial acupoint detection." Frontiers in Neurorobotics 18 (2024): 1355857. (Year: 2024).*
(Continued)

*Primary Examiner* — Jonathan S Lee

(57) ABSTRACT

The present invention provides a facial acupoint locating method, an acupuncture method, an acupuncture robot, and a storage medium. The facial acupoint locating method includes: collecting an RGB image and a depth image of a face by using a depth camera, and generating three-dimensional point cloud data of the face based on the RGB image and the depth image; inputting the three-dimensional point cloud data of the face into a trained face segmentation model to obtain a plurality of facial feature regions, where the plurality of the facial feature regions include eyebrow regions, eye regions, a nose region, and a mouth region; and acquiring an association relationship between the plurality of the facial feature regions and key acupoint points, and determining locations of the facial acupoints based on the association relationship and the plurality of the facial feature regions.

8 Claims, 12 Drawing Sheets

Collect an RGB image and a depth image of a face by using a depth camera, and generate three-dimensional point cloud data of the face based on the RGB image and the depth image — S101

Input the three-dimensional point cloud data of the face into a trained face segmentation model to obtain a plurality of facial feature regions, where the plurality of facial feature regions include eyebrow regions, eye regions, a nose region, and a mouth region — S102

Acquire an association relationship between the plurality of the facial feature regions and key acupoint points, and determine locations of the facial acupoints based on the association relationship and the plurality of the facial feature regions — S103

(51) Int. Cl.
  *G06T 7/10* (2017.01)
  *G06T 7/50* (2017.01)
  *G06T 7/73* (2017.01)
  *G06V 10/26* (2022.01)
  *G06V 10/80* (2022.01)
  *G06V 10/82* (2022.01)
  *G06V 40/16* (2022.01)
  *G05D 105/30* (2024.01)
  *G05D 111/10* (2024.01)

(52) U.S. Cl.
  CPC ............ *G06T 7/75* (2017.01); *G06V 10/26* (2022.01); *G06V 10/80* (2022.01); *G06V 10/82* (2022.01); *G05D 2105/31* (2024.01); *G05D 2111/10* (2024.01); *G06T 2207/10024* (2013.01); *G06T 2207/10028* (2013.01); *G06T 2207/20081* (2013.01); *G06T 2207/20084* (2013.01); *G06T 2207/20221* (2013.01); *G06T 2207/30201* (2013.01)

(58) Field of Classification Search
  CPC ............ G06T 7/75; G06T 2207/10024; G06T 2207/10028; G06T 2207/20081; G06T 2207/20084; G06T 2207/20221; G06T 2207/30201; G05D 1/60; G05D 2105/31; G05D 2111/10
  USPC ........................................................ 382/103
  See application file for complete search history.

(56) References Cited

U.S. PATENT DOCUMENTS

| | | |
|---|---|---|
| 2020/0405148 A1 | 12/2020 | Tran |
| 2023/0080031 A1 | 3/2023 | Zhang et al. |
| 2023/0206603 A1 | 6/2023 | Zhang et al. |

FOREIGN PATENT DOCUMENTS

| | | | |
|---|---|---|---|
| CN | 113537057 A | | 10/2021 |
| CN | 113947799 A | * | 1/2022 |
| CN | 114511508 A | | 5/2022 |
| CN | 115227569 A | | 10/2022 |
| CN | 115457598 A | | 12/2022 |
| CN | 115512411 A | | 12/2022 |
| CN | 116740026 A | | 9/2023 |
| CN | 117475497 A | * | 1/2024 |
| KR | 20230141175 A | | 10/2023 |

OTHER PUBLICATIONS

C. Zheng, Research on AR System of Facial Acupoint Recognition Based on Deep Learning Master's thesis, Qingdao University of Science and Technology, 2022 (Year: 2022).*

Su, Mei-Ting, et al. "An acupoint health care system with real-time acupoint localization and visualization in augmented reality." Multimedia Systems 29.4 (2023): 2217-2238. (Year: 2023).*

Liu, Ying-Bin, Jian-Hua Qin, and Gui-Fen Zeng. "Facial acupoint location method based on Faster PFLD." Signal, Image and Video Processing 17.8 (2023): 4455-4463. (Year: 2023).*

Zhang, Chao, et al. "Massage Acupoint Positioning Method of Human Body Images Based on Transfer Learning." Traitement du Signal 40.6 (2023). (Year: 2023).*

Li, Yalan, et al. "AIR-Net: Acupoint image registration network for automatic acupoint recognition and localization." Displays 83 (2024): 102743. (Year: 2024).*

Zhang, Kaipeng, et al. "Joint face detection and alignment using multitask cascaded convolutional networks." IEEE signal processing letters 23.10 (2016): 1499-1503. (Year: 2016).*

Masood, Danish, and Jiang Qi. "3D Localization of hand acupoints using hand geometry and landmark points based on RGB-D CNN fusion." Annals of Biomedical Engineering 50.9 (2022): 1103-1115. (Year: 2022).*

Notification to Grant Patent Right for Invention, Chinese Application No. 202410106300.1, mailed Apr. 10, 2024 (3 pages).

CNIPA, Office Action issued for Chinese Application No. 202410106300.1, mailed Mar. 7, 2024 (8 pages).

Yang Zhao et al. Journal of Chinese Computer Systems, "Acupuncture Points Localization Algorithm About Bell's Palsy on Facial Infrared Images", vol. 33, Phase 7, No. 223-229 Pages, Issue date Jul. 15, 2012 (7 pages).

Jiawei Yu et al. "MRF Depth Map Restoration with Semantic Segmentation" vol. 36, Phase 6, No. 13-15, 18 Pages, Issue date Jul. 4, 2023 (4 pages).

* cited by examiner

FACIAL ACUPOINT LOCATING METHOD, ACUPUNCTURE METHOD, ACUPUNCTURE ROBOT AND STORAGE MEDIUM

TECHNICAL FIELD

The present invention belongs to the technical field of acupoint recognition, and particularly relates to a facial acupoint locating method, an acupuncture method, an acupuncture robot and a storage medium.

BACKGROUND

There are many acupoints on faces, including temples, Yangbai acupoints, Zanzhu acupoints, Sizhukong acupoints, Chengqi acupoints, Sibai acupoints, Dicang acupoints, Jiache acupoints, Xiaguan acupoints, a Yintang acupoints, Shuigou acupoints, a Kouheliao acupoint, Jingming acupoints, Suliao acupoints, etc. The facial acupoints have many applications in health care and medical treatment, and different functions can be achieved at different acupoints. The Yintang acupoints and the Shuigou acupoints (Renzhong acupoints) are commonly used. When a person is comatose or unconscious, pinching can be performed on the Shuigou acupoint of the person. Rubbing the acupoints around eyes, such as the Sizhukong acupoints, the Jingming acupoints, the Zanzhu acupoints, the Chengqi acupoints, and the Sibai acupoints, can protect the eyes. Eye exercises that people usually do are to rub these acupoints. The Yangbai acupoints, Yuyao acupoints, the Dicang acupoints, the Jiache acupoints and other acupoints can be clinically used for treating facial paralysis. Yingxiang points on both sides of a nose, as acupoints of a large intestine meridian, are often used for treating diseases of the nose.

At present, facial acupoint locating methods mainly include a traditional acupoint locating method and an acupoint locating method with a modern technology. The traditional acupoint locating method is mainly to, based on experiences and skills accumulated and passed by traditional Chinese physicians for many years, manually analyze facial features, such as a skin texture, a spot and a facial structure, to determine the acupoints. It takes a lot of time and vigour, lacks automation, and features strong individual subjectivity. There are deviations in locating results of acupoints among various sects, and traditional Chinese physicians require high experiences. The acupoint locating method with the modern technology is mainly to observe and determine the acupoint locations through imaging and a scanning technology, such as use of X-ray, MRI, CT scans and other modern medical imaging technologies. However, the acupoint locating method with the modern technology is inconvenient, requires expensive devices, and is high in detection cost, and real-time detection cannot be performed; and an imaging device has a radiation exposure situation.

Therefore, it is urgent to provide a facial acupoint locating method, an acupuncture method, an acupuncture robot, and a storage medium to solve the above technical problems.

SUMMARY

In view of this, it is necessary to provide a facial acupoint locating method, an acupuncture method, an acupuncture robot, and a storage medium to solve the technical problems of low acupoint locating efficiency, and poor locating accuracy and real-time performance in the prior art.

On one hand, the present invention provides a facial acupoint locating method, including:
 collecting an RGB image and a depth image of a face by using a depth camera, and generating three-dimensional point cloud data of the face based on the RGB image and the depth image;
 inputting the three-dimensional point cloud data of the face into a trained face segmentation model to obtain a plurality of facial feature regions, where the plurality of the facial feature regions include eyebrow regions, eye regions, a nose region, and a mouth region; and
 acquiring an association relationship between the plurality of the facial feature regions and key acupoint points, and determining locations of the facial acupoints based on the association relationship and the plurality of the facial feature regions.

In some possible implementations, the depth camera includes an RGB video cam and a depth sensor. The collecting an RGB image and a depth image of a face by using a depth camera, and generating three-dimensional point cloud data of the face based on the RGB image and the depth image, include:
 collecting the RGB image based on the RGB video cam;
 collecting the depth image based on the depth sensor;
 acquiring first camera parameters of the RGB video cam and second camera parameters of the depth sensor; and
 fusing the RGB image to the depth image based on the first camera parameters and the second camera parameters, to obtain the three-dimensional point cloud data of the face.

In some possible implementations, the face segmentation model includes a feature extraction module, a channel attention module, a spacial attention module, and a segmentation module. The inputting the three-dimensional point cloud data of the face into a trained face segmentation model to obtain a plurality of facial feature regions includes:
 inputting the three-dimensional point cloud data of the face into the feature extraction module to obtain facial features;
 inputting the facial features into the channel attention module to obtain channel features;
 inputting the channel features into the spacial attention module to obtain space-channel features; and
 inputting the space-channel features into the segmentation module to obtain the plurality of the facial feature regions.

In some possible implementations, the feature extraction module includes a first multi-layer perceptron, a second multi-layer perceptron, a third multi-layer perceptron, a fourth multi-layer perceptron, a fifth multi-layer perceptron, a maximum pooling layer, and a feature concatenation layer which are sequentially connected and share a weight.

Each of the first multi-layer perceptron, the second multi-layer perceptron, the third multi-layer perceptron, the fourth multi-layer perceptron, and the fifth multi-layer perceptron includes a convolutional layer, a batch normalization layer, and an activation function layer;
 the first multi-layer perceptron is used for extracting features of a first scale of a three-dimensional point cloud of the face to obtain first-scale features;
 the second multi-layer perceptron is used for extracting features of a second scale of the three-dimensional point cloud of the face to obtain second-scale features;
 the third multi-layer perceptron is used for extracting features of a third scale of the three-dimensional point cloud of the face to obtain third-scale features;

the fourth multi-layer perceptron is used for extracting features of a fourth scale of the three-dimensional point cloud of the face to obtain fourth-scale features;

the fifth multi-layer perceptron is used for extracting features of a fifth scale of the three-dimensional point cloud of the face to obtain fifth-scale features;

the maximum pooling layer is used for performing maximum pooling on the fifth-scale features to obtain global features; and the feature concatenation layer is used for concatenation the first-scale features, the second-scale features, the third-scale features, the fourth-scale features, the fifth-scale features, and the global features to obtain the facial features.

In some possible implementations, the segmentation module includes a first segmentation unit, a second segmentation unit, a third segmentation unit, and a fourth segmentation unit;

each of the first segmentation unit and the second segmentation unit includes a convolutional layer, a batch normalization layer, an activation function layer, and a dropout layer;

the third segmentation unit includes a convolutional layer, a batch normalization layer, and an activation function layer; and the fourth segmentation unit includes a convolutional layer and a batch normalization layer.

In some possible implementations, the channel attention module includes a channel maximum pooling layer and a channel average pooling layer which are parallel, as well as a channel multi-layer perceptron, a first channel activation function layer, a channel feature weighting layer, and a second channel activation function layer which are sequentially connected after the channel maximum pooling layer and the channel average pooling layer.

In some possible implementations, the spacial attention module includes a space maximum pooling layer and a space average pooling layer which are parallel, as well as a spacial feature concatenation layer, a spacial convolutional layer, a spacial activation function layer, and a spacial feature weighting layer which are sequentially connected after the space maximum pooling layer and the space average pooling layer.

On the other hand, the present invention further provides an acupuncture method, including:

determining facial acupoints of a person to be acupunctured based on the facial acupoint locating method;

acquiring symptoms of the person to be acupunctured, and determining a target acupoint in the facial acupoints based on the symptoms;

acquiring an initial location of an acupuncture needle, and determining a planning path based on the initial location, the target acupoint and a preset path planning algorithm; and controlling the acupuncture needle to reach the facial acupoint along the planning path, where the facial acupoint locating method is that described in any of the above possible implementations.

On the other hand, the present invention further provides an acupuncture robot, including a storage and a processor, where the storage is used for storing programs; and the processor, coupled to the storage, is used for executing the programs stored in the storage, so as to implement the steps in the facial acupoint locating method and/or the steps in the acupuncture method described in any of the above possible implementations.

On the other hand, the present invention further provides a computer readable storage medium which stores programs or instructions. The programs or the instructions, when being executed by the processor, implement the steps in the facial acupoint locating method and/or the steps in the acupuncture method described in any one of the above possible implementations.

Using the above embodiments has the beneficial effects: in the facial acupoint locating method provided by the present invention, the RGB image and the depth image of the face are collected through the depth camera; the three-dimensional point cloud data of the face is generated based on the RGB image and the depth image; then the three-dimensional point cloud data of the face is input into the trained face segmentation model to obtain the plurality of facial feature regions; and then the locations of the facial acupoints can be determined by the acquired association relationship between the plurality of facial feature regions and the key acupoint points, so as to locate the facial acupoints. The present invention does not rely on the experiences and the skills of the traditional Chinese physicians, eliminates influences of human factors and individual differences between persons to be acupunctured, and improves the locating efficiency and accuracy of the facial acupoints. Besides, compared with a manner of locating acupoints through a medical imaging device, the present invention has the advantages that the depth camera is low in device cost, short in shooting time, strong in real-time feedback performance, and lighter, more convenient and rapider, so that the locating efficiency of the facial acupoints and real-time performance can be further improved.

Further, compared with a medical imaging means, determining the locations of the facial acupoints based on the three-dimensional point cloud data of the face can provide more details and depth information, and more realistic and accurate description of a facial structure, whereby the locating accuracy of the facial acupoints can be further improved.

BRIEF DESCRIPTION OF DRAWINGS

To describe the technical solutions in embodiments of the present invention more clearly, the following briefly introduces the accompanying drawings for describing the embodiments. Apparently, the accompanying drawings in the following description show merely some embodiments of the present invention, and those skilled in the art may still derive other accompanying drawings from these accompanying drawings without making creative efforts.

DETAILED DESCRIPTION OF THE EMBODIMENTS

The following clearly and completely describes the technical solutions in the embodiments of the present invention with reference to the accompanying drawings in the embodiments of the present invention. Apparently, the embodiments described are merely a part rather than all of the embodiments of the present invention. Based on the embodiments in the present invention, all other embodiments obtained by those skilled in the art without making creative efforts shall fall within the scope of protection of the present invention.

It should be understood that the schematic drawings are not drawn in proportion to physical objects. Flowcharts used in the present invention show operations implemented according to some embodiments of the present invention. It should be understood that the operations of the flowcharts can be implemented out of order, and the steps without a logical contextual relationship may be implemented in reverse order or implemented at the same time. In addition, under the guidance of the content of the present invention, those skilled in the art can add one or more other operations to each flowchart, and can also remove one or more operations from each flowchart. Some of block diagrams shown in the accompanying drawings are functional entities and do not necessarily have to correspond to physically or logically separate entities. These functional entities may be implemented in software, or implemented in one or more hardware modules or integrated circuits, or implemented in different network and/or processor systems and/or microcontroller systems.

The description of "first", "second", etc. involved in the embodiments of the present invention are for descriptive purposes only, and cannot be understood to indicate or imply relative importance or implicitly indicate the quantity of indicated technical features. Therefore, the technical features defined by "first" and "second" may explicitly or implicitly include at least one such feature.

The reference to "embodiments" herein means that a particular feature, structure, or characteristic described with reference to the embodiments may be included in at least one embodiment of the present invention. The appearances of the phrases in various place in the specification may not refer to a same embodiment, or an independent or a candidate embodiment that is mutually exclusive of other embodiments. Those skilled in the art explicitly and implicitly understand that the embodiments described herein may be combined with other embodiments.

The present invention provides a facial acupoint locating method, an acupuncture method, an acupuncture robot, and a storage medium which are described separately.

Figure 1:
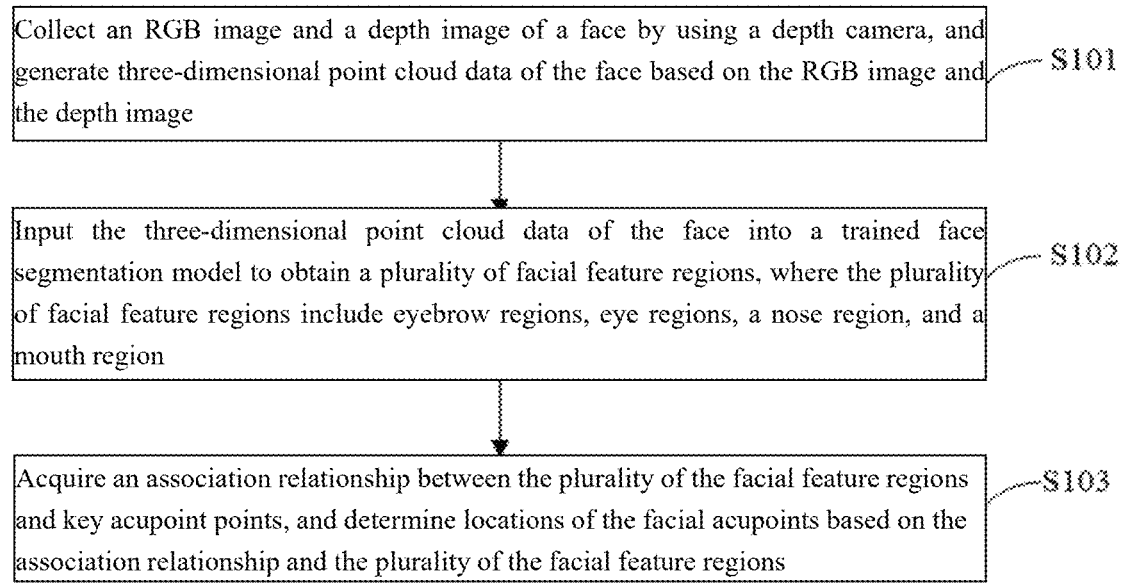
FIG. 1 is a schematic flowchart of an embodiment of a facial acupoint locating method provided by the present invention.

FIG. 1 is a schematic flowchart of an embodiment of a facial acupoint locating method provided by an embodiment of the present invention. As shown in FIG. 1, the facial acupoint locating method includes:

S101, collecting an RGB image and a depth image of a face by using a depth camera, and generating three-dimensional point cloud data of the face based on the RGB image and the depth image;

S102, inputting the three-dimensional point cloud data of the face into a trained face segmentation model to obtain a plurality of facial feature regions, where the plurality of facial feature regions include eyebrow regions, eye regions, a nose region, and a mouth region; and S103, acquiring an association relationship between the plurality of facial feature regions and key acupoint points, and determining locations of the facial acupoints based on the association relationship and the plurality of facial feature regions.

Compared with the prior art, in the facial acupoint locating method provided by the embodiment of the present invention, the RGB image and the depth image of the face are collected through the depth camera; the three-dimensional point cloud data of the face is generated based on the RGB image and the depth image; then the three-dimensional point cloud data of the face is input into the trained face segmentation model to obtain facial features of a plurality of associated acupoints; and then locations of the facial acupoints can be determined by the acquired association relationship between the plurality of facial feature regions and the key acupoint points, so as to locate the facial acupoints. The embodiments of the present invention do not rely on the experiences and the skills of traditional Chinese physicians, eliminates influences of human factors and individual differences between persons to be acupunctured, and improves the locating efficiency and accuracy of the facial acupoints. Besides, compared with a manner of locating acupoints through a medical imaging device, the present invention has the advantages that the depth camera is low in device cost, short in shooting time, strong in real-time feedback performance, and lighter, more convenient and rapider, so that the locating efficiency of the facial acupoints and real-time performance can be further improved.

Further, compared with a medical imaging means, determining the locations of the facial acupoints based on the three-dimensional point cloud data of the face can provide more details and depth information, and more realistic and accurate description of a facial structure, whereby the locating accuracy of the facial acupoints can be further improved.

In a specific embodiment of the present invention, the depth camera is a Kinect depth camera.

The Kinect depth camera uses a 1-megapixel To F imaging chip having an excellent pixel technology, so as to achieve higher modulation frequency and depth measurement accuracy, and also uses a multi-phase depth calculation method to achieve high-accuracy depth measurement, whereby the locating accuracy of the facial acupoints can be further ensured.

It is to be noted that: the face segmentation model in step S102 needs to be trained before use; and its training process may be as follows: multiple three-dimensional point cloud data of the face is acquired based on step S101; and the facial feature regions of the three-dimensional point cloud data of the face are labeled based on a manual labeling manner to generate a training set; an initial face segmentation model is trained based on the training set; and when the initial face segmentation model is trained to meet the requirements, the face segmentation model is obtained.

Figure 2:
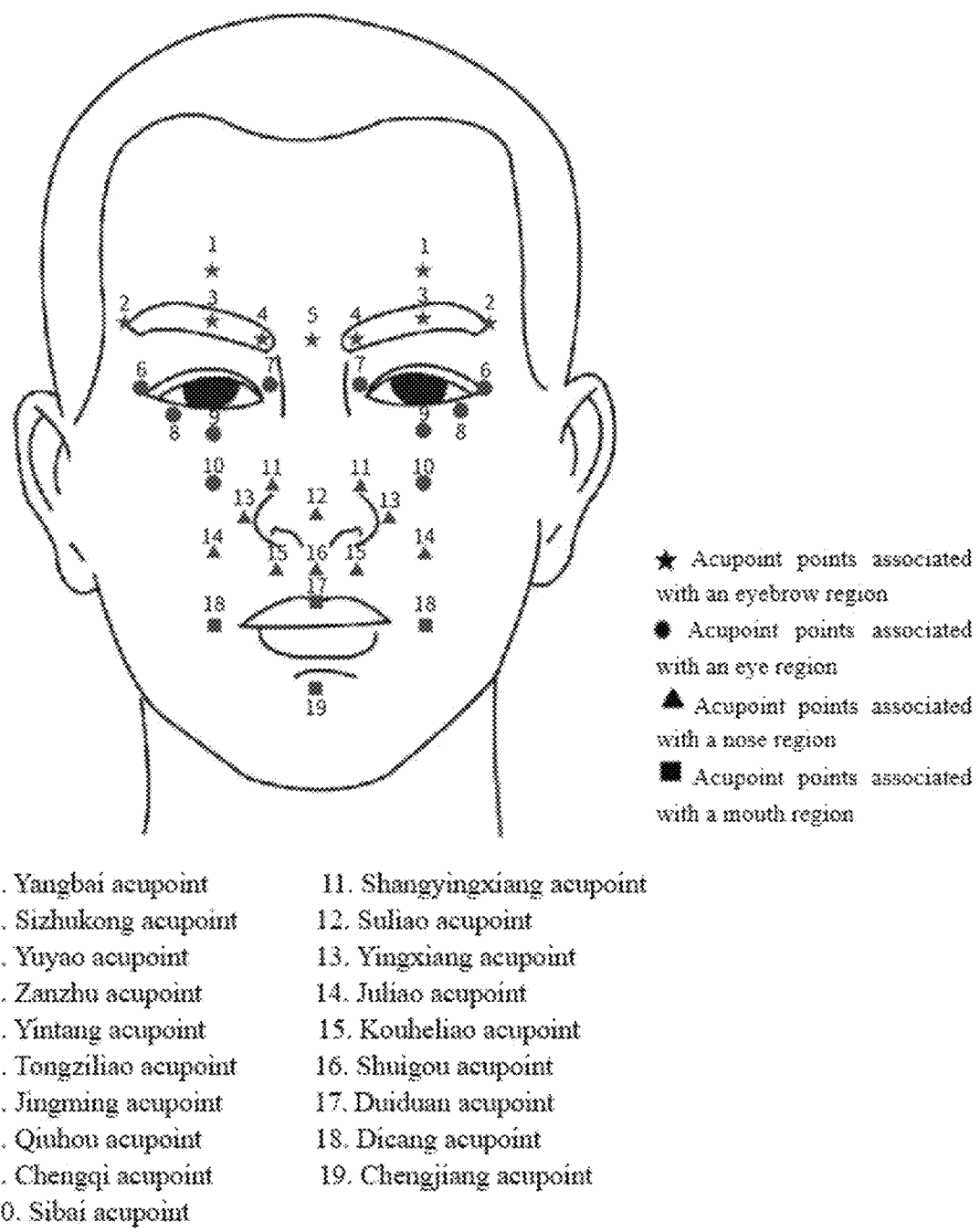
FIG. 2 is a schematic diagram of an embodiment of facial acupoints provided by the present invention.

In a specific embodiment of the present invention, the association relationship in step S103 can be established according to the head and neck channels and acupoints (front) in the "GB/T 22163-2008 Illustrations For Location of Acupuncture Points" and facial acupoint points and five sense organ feature regions described in the national standard "GB/T 12346-2021 Nomenclature and Location of Meridian Points". As shown in FIG. 2, a Yintang acupoint is at a key point of a middle depression at inner ends of two eyebrows; a Suliao acupoint is at a key point just in a center of a nasal tip; a Shuigou acupoint is at a key point of an intersection point of upper ⅓ and middle ⅓ of a philtrum; a Duiduan acupoint is at a key point of a midpoint of a labial tubercle; and a Chengjiang acupoint is at a key point of a median depression of a mentolabial sulcus. There are Yangbai acupoints on upper sides, Yuyao acupoints in middles, and Sizhukong acupoints and Zanzhu acupoints correspondingly on left and right sides in the eyebrow regions. Each Yangbai acupoint is at a key point 1 inch above each eyebrow and directly above a pupil; each Yuyao acupoint is at a key point directly above a pupil and in the middle of the corresponding eyebrow; each Sizhukong acupoint is at a key point on the leftmost and in an eyebrow tip depression; and each Zanzhu acupoint is at a key point on the rightbest, in an eyebrow tip depression, and in a frontal notch. A Tongziliao acupoint, a Jingming acupoint, a Chengqi acupoint, a Qiuhou acupoint, and a Sibai acupoint are correspondingly on left, right and lower sides around each eye region. The Tongziliao acupoint is at a key point in a depression 0.5 inch away from an outer side of an outer canthus; the Jingming acupoint is at a key point in a depression slightly above a conner of an inner canthus; the Chengqi acupoint is at a key point between an eyeball and an infraorbital margin, and directly under the pupil; the Qiuhou acupoint is at the key point of a junction of ¼ of outer margin and ¾ of inner margin of the infraorbital margin; and the Sibai acupoint, as an infraorbital foramen, is at a key point directly under the pupil. Around the nose region, there are Yingxiang acupoints and Juliao acupoints on left and right sides, Shangyingxiang acupoints on upper left and right sides, a Kouheliao acupoint and the Shuigou acupoint on a lower side, and the Suliao acupoint in a center of the nose. The Yingxiang acupoints are at key points next to midpoints of outer margins of nose wings and in nasolabial folds; the Juliao acupoints are at key points on a horizontal inferior margin of the nose wings and directly below the pupils; the Shangyingxiang acupoints are at key points of junctions of nasal alar cartilage and turbinate; the Kouheliao acupoint is at a key point of an intersection point of upper ⅓ and lower ⅔ of a horizontal philtrum line and directly below exterior margins of the nostrils; the Shuigou acupoint is at a key point of an intersection point of upper ⅓ and the middle ⅓ of the philtrum; and the Suliao acupoint is at a key point just in the center of the nasal tip. There are the Duiduan acupoint on an upper side, the Chengjiang acupoint on a lower side, and the Dicang acupoints on left and right sides in the mouth region. The Duiduan acupoint is at the key point of the midpoint of the labial tubercle; the Chengjiang acupoint is at the key point of the median depression of the mentolabial sulcus; and the Dicang acupoints are at key points 0.4 inch next to angulusoris.

Figure 3:
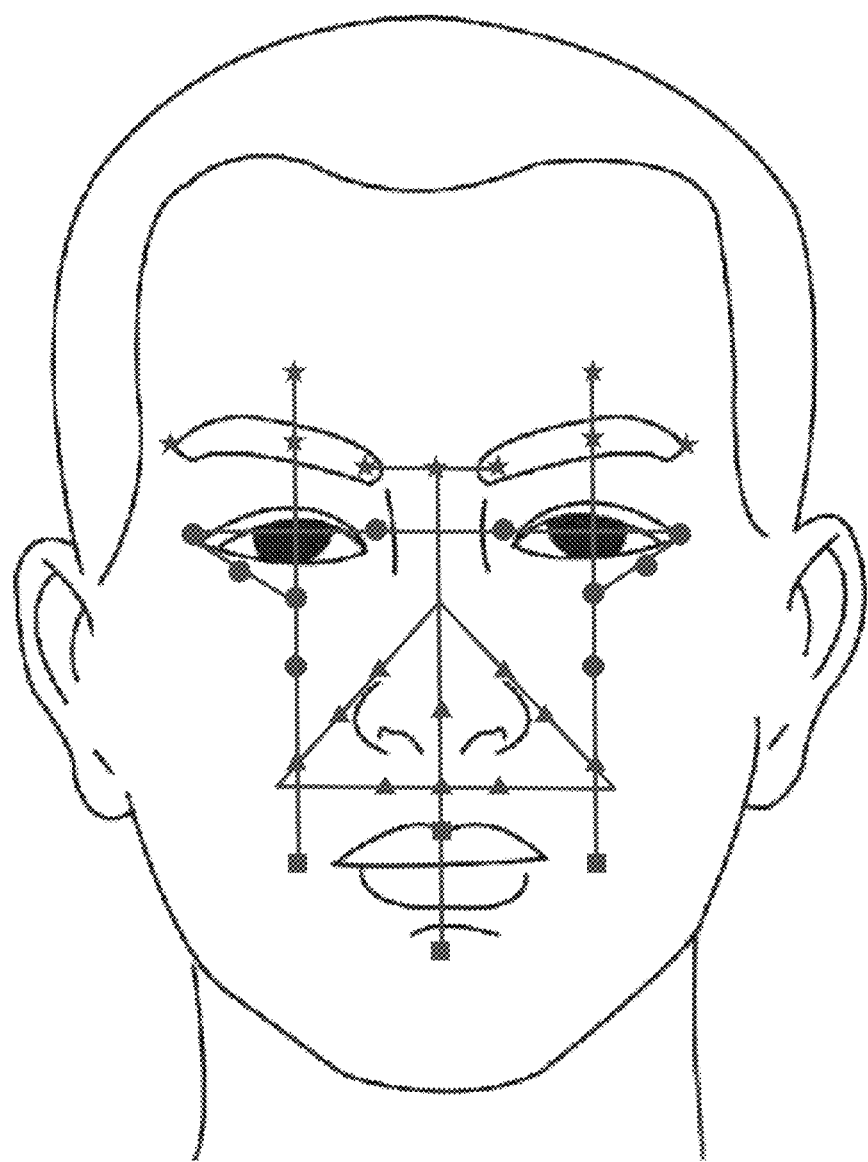
FIG. 3 is a schematic diagram of an embodiment of a topological relationship between facial acupoints provided by the present invention.

Besides, as shown in FIG. 3, there are a topological relationship and fitting lines between the above acupoint points. For example, the Yintang acupoint, the Suliao acupoint, the Shuigou acupoint, the Duiduan acupoint, and the Chengjiang acupoint are in a central axis of the face; the Yangbai acupoints, the Yuyao acupoints, the Chengqi acupoints, the Sibai acupoints, the Juliao acupoints, and the Dicang acupoints are in a same vertical line on left and right faces; and the Zanzhu acupoints and the Yintang acupoints are in a same horizontal line, the Kouheliao acupoint and the Shuigou acupoint are in a same horizontal line, the Shangyingxiang acupoints are in a same horizontal line, the Yingxiang acupoints are in a same horizontal line, and the Juliao acupoints are in a same horizontal line. There is a certain relationship between the acupoint points associated with the nose region and an isosceles triangle. In order to ensure the accuracy of the determined association relationship, in some embodiments of the present invention, the Tongziliao acupoints, the Qiuhou acupoints, and the Sibai acupoints in the left and right eye regions are fitted into a straight line; the Tongziliao acupoints and the Jingming acupoints are fitted into another straight line; n acupoint points are fitted by using a least square method; a variance error is established for derivation to obtain parameters; and a vertical error from each acupoint point to each straight line is minimized. According to an anatomical structure of a human body, the acupoints on the left and right sides of the face are symmetrical, also facial five sense organ regions are symmetrical, that is, the eyebrows, the eyes, the nose and the mouth are symmetrical along the central axis of the face. A size of inch mentioned above can be taken according to proportional "inch conversion from bone measurements" measurement. For example, a distance from a glabella (the Yintang acupoint) to the middle of an anterior hairline is 3 inches to be used for determining a longitudinal distance between the acupoints; and a distance between two frontal hairlines (Touwei acupoints) is 9 inches to be used for determining a transverse distance between the acupoints. There are certain equal length folds between two bone joints, with each equal part being 1 inch, and 10 equal parts being 1 foot as a basis for acupoint determination.

It should be understood that: there are 47 acupoint points in the face of the human body. There are numerous acupoint points, not all of which can be used. Therefore, the key acupoint points in step S103 are commonly used acupoint points.

Specifically, the key acupoint points can be set or adjusted according to actual application scenarios or experiences, which will not specifically limited here.

Figure 4:
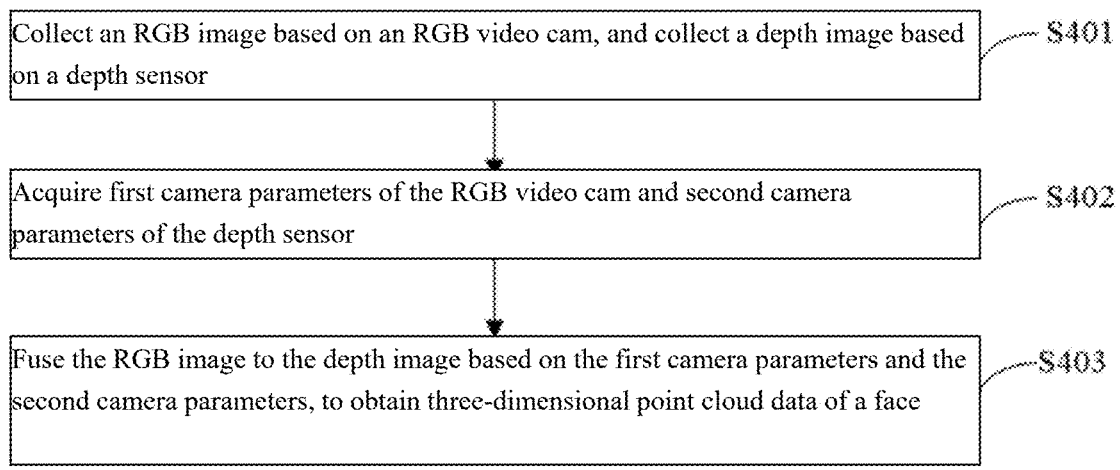
FIG. 4 is a schematic flowchart of an embodiment of S101 in FIG. 1 of the present invention.

In some embodiments of the present invention, the depth camera includes an RGB video cam and a depth sensor. As shown in FIG. 4, step S101 includes:

S401, collecting an RGB image based on the RGB video cam, and collecting a depth image based on the depth sensor;

S402, acquiring first camera parameters of the RGB video cam and second camera parameters of the depth sensor; and S403, fusing the RGB image to the depth image based on the first camera parameters and the second camera parameters, to obtain the three-dimensional point cloud data of the face, where the first camera parameters and the second camera parameters include a resolution, a frame rate, a field of view, calibration information, etc.

It is to be noted that: in order to avoid an influence of noise in the three-dimensional point cloud data of the face on a locating result, in some embodiments of the present invention, after the step S403, it is also necessary to pre-process the three-dimensional point cloud data of the face.

Specifically, redundant regions, such as irregular hair and body, other than the face in the three-dimensional point cloud data of the face are removed; and isolated points on the margin of the face in the three-dimensional point cloud data of the face are also removed.

Figure 5:
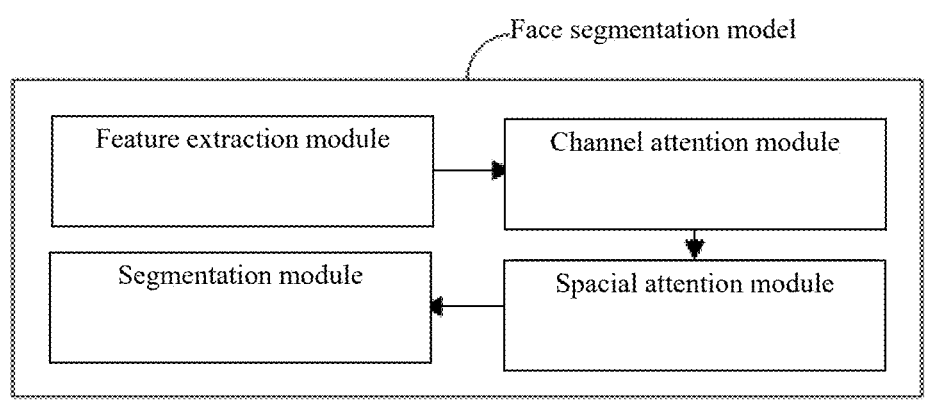
FIG. 5 is a schematic structural diagram of an embodiment of a face segmentation model provided by the present invention.
Figure 6:
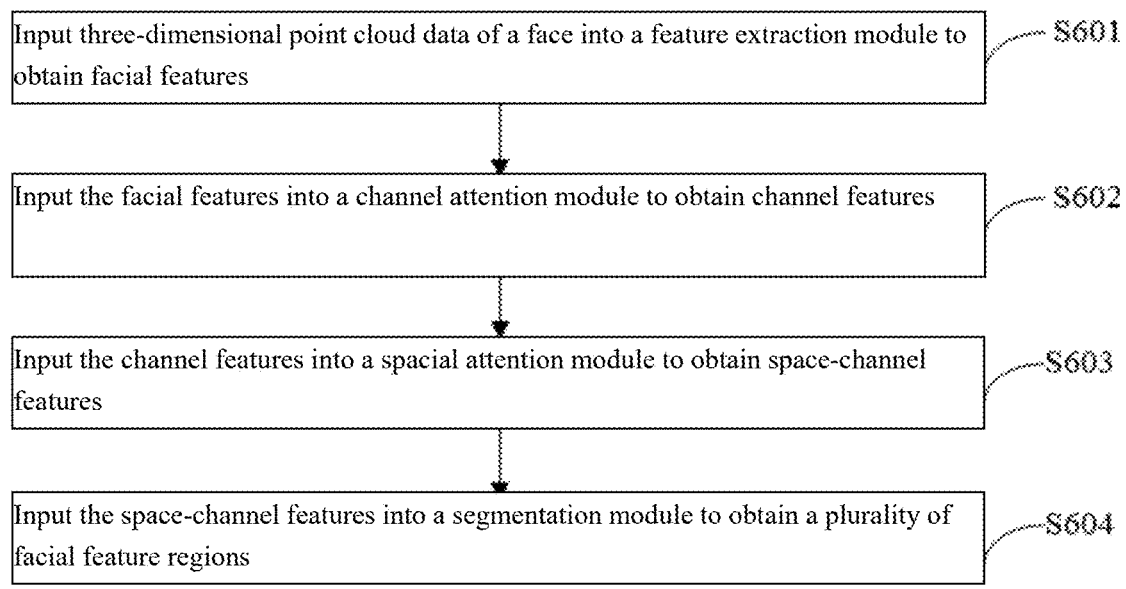
FIG. 6 is a schematic flowchart of an embodiment of S102 in FIG. 1 of the present invention.

In some embodiments of the present invention, as shown in FIG. 5, the face segmentation model includes a feature extraction module, a channel attention module, a spacial attention module, and a segmentation module. As shown in FIG. 6, the step S102 includes:

S601, inputting the three-dimensional point cloud data of the face into the feature extraction module to obtain facial features;

S602, inputting the facial features into the channel attention module to obtain channel features;

S603, inputting the channel features into the spacial attention module to obtain space-channel features; and S604, inputting the space-channel features into the segmentation module to obtain a plurality of facial feature regions.

The embodiments of the present invention introduce a channel attention mechanism and a spacial attention mechanism, where the attention mechanisms can help the face segmentation model to pay attention to local features and global features at the same time. It is important to deal with a relationship between a human face part and a whole face for the face segmentation model. The accuracy of the face segmentation model determining locations of the eyebrows, the eyes, the nose, and the mouth throughout the face is improved, and these regions are better segmented. Besides, the attention mechanisms establish associations between various points in the point cloud, and effectively deal with complicated relationships between various parts of the face, for example, the eyebrows are above the eyes, the eyes are above the nose, the mouth is below the nose, and the eyes are elliptical, the nose is triangular. The attention mechanisms can help the model capture these global association information, to improve the segmentation accuracy. Besides, the face segmentation model becomes more robust, so as to adapt to different face shape and posture changes.

Figure 7:
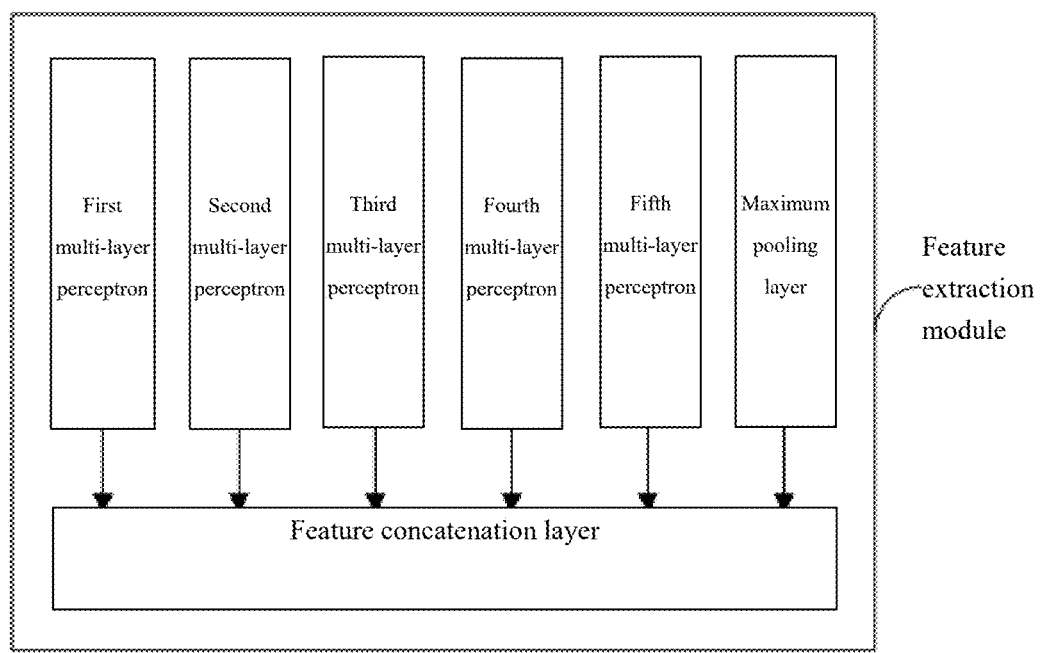
FIG. 7 is a schematic structural diagram of an embodiment of a feature extraction module provided by the present invention.

In some embodiments of the present invention, as shown in FIG. 7, the feature extraction module includes a first multi-layer perceptron, a second multi-layer perceptron, a third multi-layer perceptron, a fourth multi-layer perceptron, a fifth multi-layer perceptron, a maximum pooling layer, and a feature concatenation layer which are sequentially connected and share a weight;

each of the first multi-layer perceptron, the second multi-layer perceptron, the third multi-layer perceptron, the fourth multi-layer perceptron, and the fifth multi-layer perceptron includes a convolutional layer, a batch normalization (BN) layer, and an activation function layer;

the first multi-layer perceptron is used for extracting features of a first scale of a three-dimensional point cloud of the face to obtain first-scale features;

the second multi-layer perceptron is used for extracting features of a second scale of the three-dimensional point cloud of the face to obtain second-scale features;

the third multi-layer perceptron is used for extracting features of a third scale of the three-dimensional point cloud of the face to obtain third-scale features;

the fourth multi-layer perceptron is used for extracting features of a fourth scale of the three-dimensional point cloud of the face to obtain fourth-scale features;

the fifth multi-layer perceptron is used for extracting features of a fifth scale of the three-dimensional point cloud of the face to obtain fifth-scale features;

the maximum pooling layer is used for performing maximum pooling on the fifth-scale features to obtain global features; and the feature concatenation layer is used for concatenation the first-scale features, the second-scale features, the third-scale features, the fourth-scale features, the fifth-scale features, and the global features to obtain the facial features.

In a specific embodiment of the present invention, scale features obtained by the first multi-layer perceptron, the second multi-layer perceptron, the third multi-layer perceptron, the fourth multi-layer perceptron, and the fifth multi-layer perceptron are in sizes of 64, 128, 256, 512, 1024, and 2048 in sequence.

In the embodiments of the present invention, by setting a plurality of multi-layer perceptrons extracting different scales, features of different scales of the three-dimensional point cloud of the face may be extracted, which can improve the recognition accuracy of the facial acupoints.

It is to be noted that: in order to improve the performance of the face segmentation model, the feature concatenation layer can also concatenate a total number of target categories in the training set to the first-scale features, the second-scale features, the third-scale features, the fourth-scale features, the fifth-scale features, and the global features.

Among them, the target categories in the training set may include six categories: a left eyebrow, a right eyebrow, a left eye, a right eye, a nose, and a mouth, and then the total number of the target categories is 6.

An activation function of the activation function layer of each multi-layer perceptron is a Relu function.

Figure 8:
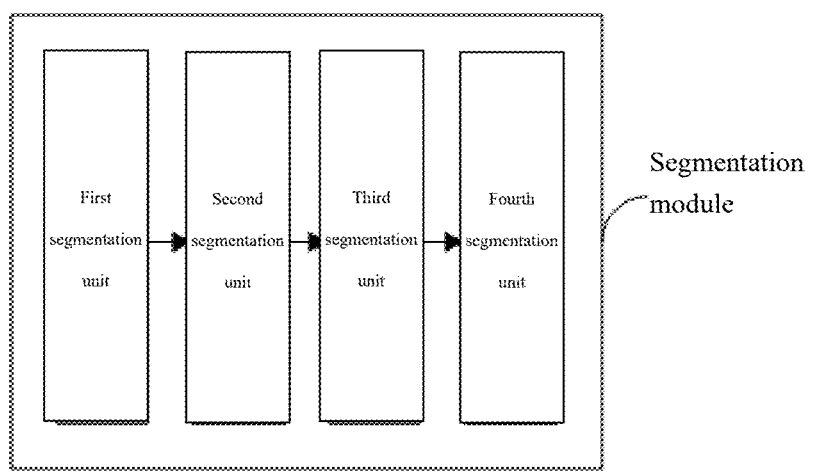
FIG. 8 is a schematic structural diagram of an embodiment of a segmentation module provided by the present invention.

In some embodiments of the present invention, as shown in FIG. 8, the segmentation module includes a first segmentation unit, a second segmentation unit, a third segmentation unit, and a fourth segmentation unit which are sequentially connected.

Each of the first segmentation unit and the second segmentation unit includes a convolutional layer, a batch normalization layer, an activation function layer, and a dropout layer.

The third segmentation unit includes a convolutional layer, a batch normalization layer, and an activation function layer.

The fourth segmentation unit includes a convolutional layer and a batch normalization layer.

In the embodiments of the present invention, by setting the first segmentation unit and the second segmentation unit including the dropout layers, overfitting of the face segmentation model can be effectively prevented, and the accuracy of the face segmentation model can be further improved, thereby improving the accuracy of the facial acupoint locating method, where activation functions of the activation function layers of the first segmentation unit, the second segmentation unit, the third segmentation unit, and the fourth segmentation unit are all the Relu functions.

Figure 9:
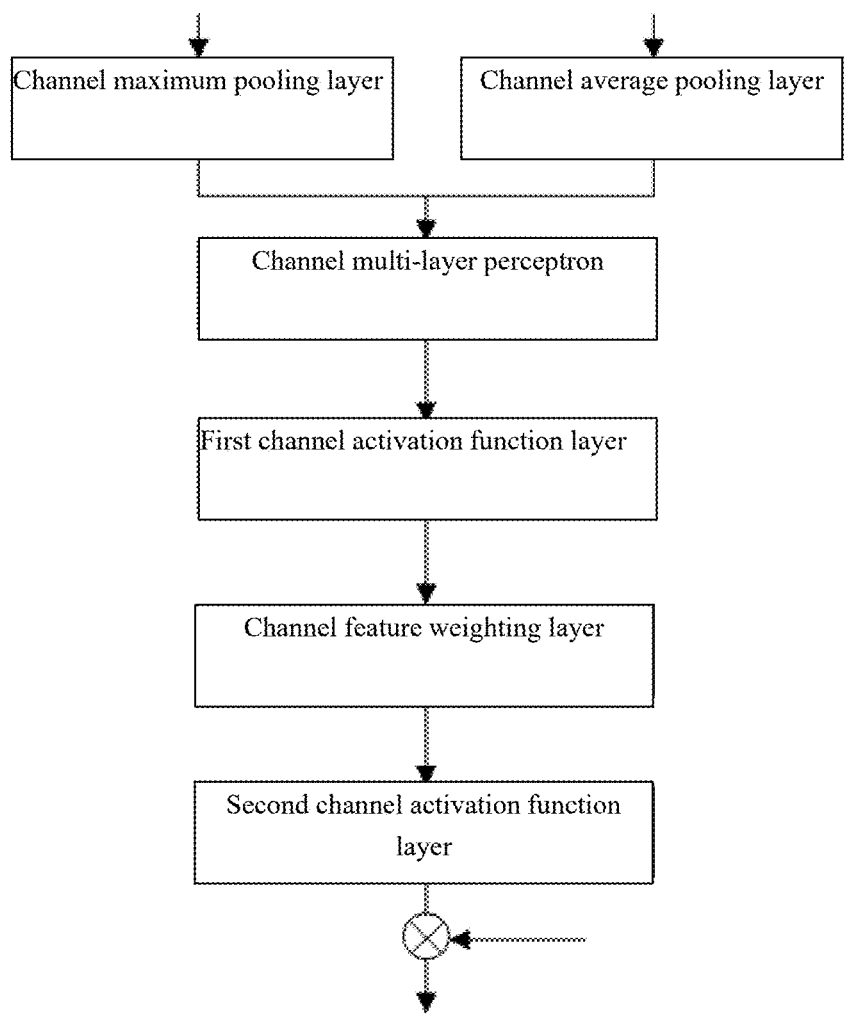
FIG. 9 is a schematic structural diagram of an embodiment of a channel attention module provided by the present invention.

In some embodiments of the present invention, as shown in FIG. 9, the channel attention module includes a channel maximum pooling layer, a channel average pooling layer, a channel multi-layer perceptron, a first channel activation function layer, a channel feature weighting layer, and a second channel activation function layer, where the purpose of the channel attention module is to reduce a spacial dimension without changing the number of channels, so as to better focus on important information in recognition of five sense organs of the face. For example, in a task of segmenting the five sense organs of the face, attention is paid to important features of the face, such as the eyebrows, the eyes, the nose, and the mouth.

Specifically, an input feature map is first processed through a channel maximum pooling layer and a channel average pooling layer which are two parallel layers, and heights and widths of the facial features are changed into a shape of C×1×1, where C is the number of the channels to capture global information in a channel direction. Then, the C×1×1 feature map is processed by the channel multi-layer perceptron, with the number of the channels compressed to be 1/L times an original number of the channels, and then restored to the original number of the channels, and then processed by the first channel activation function layer; and two activated feature maps are generated. Next, corresponding elements of the two feature maps are added one by one based on the channel feature weighting layer, and then an output result of a channel attention is obtained through the second channel activation function layer. Finally, the output result of the channel attention is multiplied by an original feature map, and the original feature map is restored to an original size of C×H×W, so as to highlight the key features of facial features, that is, to obtain the channel features, where an activation function of the first channel activation function layer is the Relu function, and an activation function of the second channel activation function layer is a sigmoid function.

Figure 10:
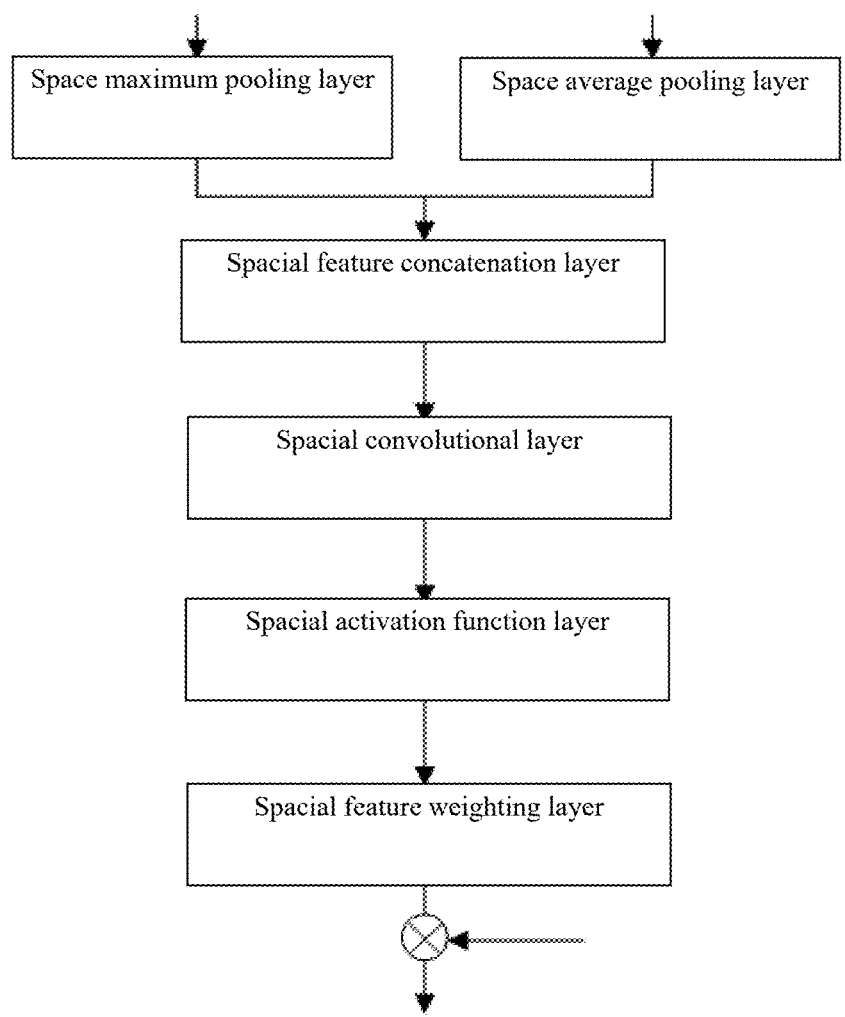
FIG. 10 is a schematic structural diagram of an embodiment of a spacial attention module provided by the present invention.

In some embodiments of the present invention, as shown in FIG. 10, the spacial attention module includes a space maximum pooling layer, a space average pooling layer, a spacial feature concatenation layer, a spacial convolutional layer, a spacial activation function layer, and a spacial feature weighting layer, where the purpose of the spacial attention module is to reduce a channel dimension with keeping the spacial dimension unchanged, for example, to better pay attention to location information of a target in the task of segmenting the five sense organs of the face.

Specifically, first, the output result (i.e. the channel features) of the channel attention module passes through the space maximum pooling layer and the space average pooling layer which are parallel to obtain two feature maps in a size of 1×H×W, where H and W represent a height and a width respectively. Then, the two feature maps are concatenated based on the spacial feature concatenation layer; then 7×7 convolutional operation is performed based on the spacial convolutional layer to convert the two feature maps into one channel feature map; and then, the feature map obtained in the previous step is activated by using the spacial activation function layer to obtain a feature map of the spacial attention. Finally, the feature map is multiplied by an original feature map, and the original feature map is restored to an original size of C×H×W, so as to highlight location information of the target, that is, to obtain the space-channel features, where an activation function of the spacial activation function layer is the sigmoid function.

Figure 11:
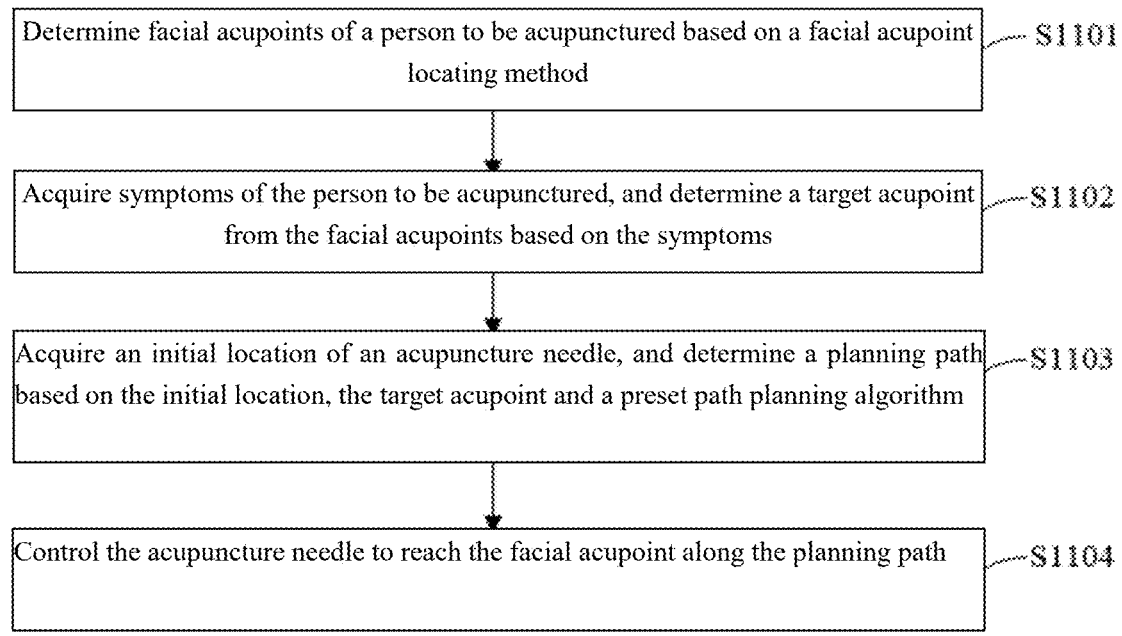
FIG. 11 is a schematic flowchart of an embodiment of an acupuncture method provided by the present invention.

The embodiment of the present invention further provides an acupuncture method, as shown in FIG. 11, including:

S1101, determining facial acupoints of a person to be acupunctured based on the facial acupoint locating method;

S1102, acquiring symptoms of the person to be acupunctured, and determining a target acupoint in the facial acupoints based on the symptoms;

S1103, acquiring an initial location of an acupuncture needle, and determining a planning path based on the initial location, the target acupoint and a preset path planning algorithm; and S1104, controlling the acupuncture needle to reach the facial acupoint along the planning path, where the facial acupoint locating method is that described in any one of the above embodiments.

In the embodiments of the present invention, by determining the planning path based on the initial location, the target acupoint and the preset path planning algorithm, and controlling the acupuncture needle to reach the facial acupoints along the planning path, the accuracy of acupuncture can be improved.

Figure 12:
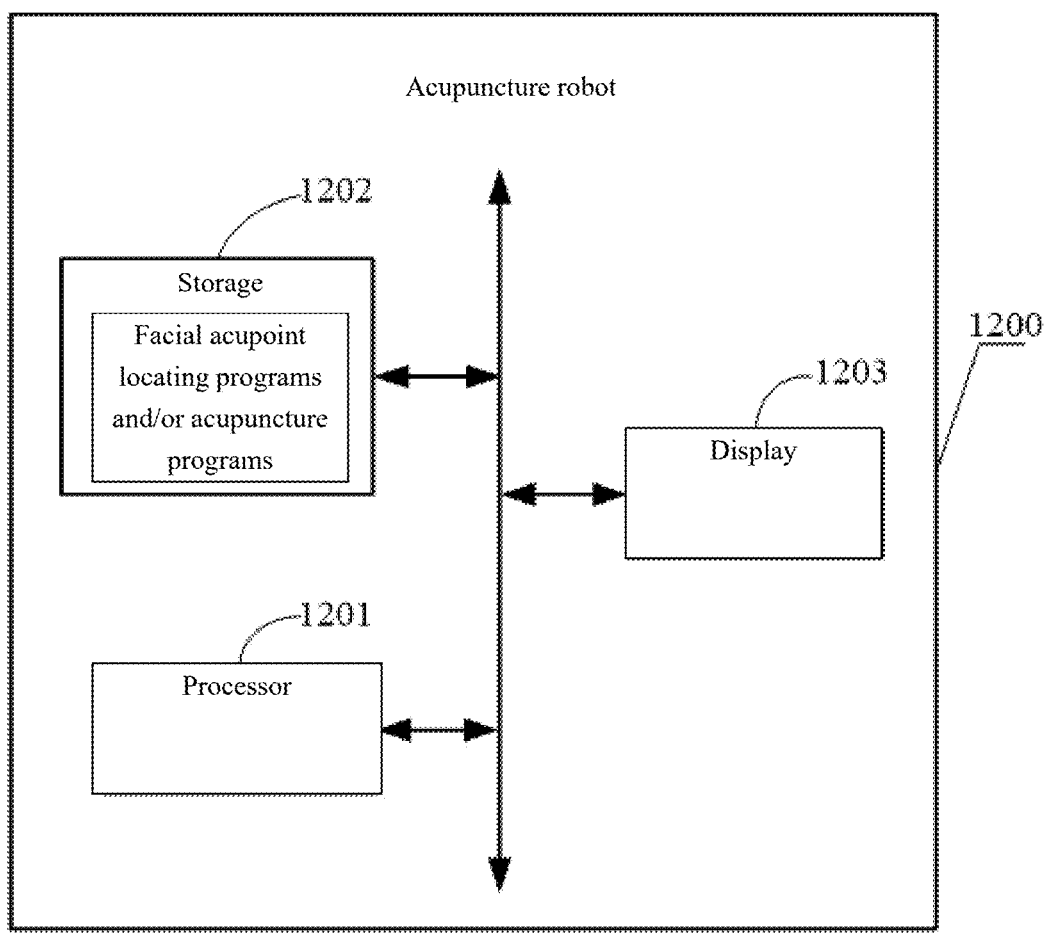
FIG. 12 is a schematic structural diagram of an embodiment of an acupuncture robot provided by the present invention.

As shown in FIG. 12, the present invention further provides an acupuncture robot 1200 correspondingly. The acupuncture robot 1200 includes a processor 1201, a storage 1202, and a display 1203. FIG. 12 shows only part of components of the acupuncture robot 1200, but it should be understood that it does not require implementation of all the components shown, and more or less components can be implemented alternatively.

In some embodiments, the storage 1202 may be an internal storage unit of the acupuncture robot 1200, for example, a hard disk or a storage of the acupuncture robot 1200. In other embodiments, the storage 1202 may be an external storage device of the acupuncture robot 1200, for example, a plug-in hard disk, a smart media card (SMC), a secure digital (SD) card, a flash card, etc. that are arranged on the acupuncture robot 1200.

Further, the storage 1202 may further include both the internal storage unit of the acupuncture robot 1200 and the external storage device. The storage 1202 is used for storing and installing application software and various data of the acupuncture robot 1200.

In some embodiments, the processor 1201 may be a central processing unit (CPU), a microprocessor, or other data processing chips, and is used for running a program code or process data stored in the storage 1202, for example, the facial acupoint locating method and/or the acupuncture method in the present invention.

In some embodiments, the display 1203 may be an LED display, a liquid crystal display, a touch liquid crystal display, an organic light-emitting diode (OLED) touch screen, etc. The display 1203 is used for displaying information of the acupuncture robot 1200 and displaying a visual user interface. Parts 1201-1203 of the acupuncture robot 1200 communicate with each other through a system bus.

In some embodiments of the present invention, when executing a facial acupoint locating program in the storage 1202, the processor 1201 may implement the following steps:

collecting an RGB image and a depth image of a face by using a depth camera, and generating three-dimensional point cloud data of the face based on the RGB image and the depth image;

inputting the three-dimensional point cloud data of the face into a trained face segmentation model to obtain a plurality of facial feature regions, where the plurality of the facial feature regions include eyebrow regions, eye regions, a nose region, and a mouth region; and acquiring an association relationship between the plurality of the facial feature regions and key acupoint points, and determining locations of the facial acupoints based on the association relationship and the plurality of the facial feature regions.

In some embodiments of the present invention, when executing an acupuncture program in the storage 1202, the processor 1201 may implement the following steps:

determining facial acupoints of a person to be acupunctured based on the facial acupoint locating method;

acquiring symptoms of the person to be acupunctured, and determining a target acupoint in the facial acupoints based on the symptoms;

acquiring an initial location of an acupuncture needle, and determining a planning path based on the initial location, the target acupoint and a preset path planning algorithm; and controlling the acupuncture needle to reach the facial acupoint along the planning path.

It should be understood that: when executing the facial acupoint locating program and/or the acupuncture program in the storage 1202, except the above functions, the processor 1201 can further implement other functions, which can be specifically seen in the descriptions of the previous related method embodiments.

Further, the acupuncture robot 1200 may further includes a mechanical arm. The acupuncture needle is connected to a front end of the mechanical arm; and a purpose of controlling the acupuncture needle to move may be achieved by controlling the mechanical arm.

Accordingly, the embodiment of the present invention further provides a computer readable storage medium which is used for storing programs or instructions readable by a computer. The programs or the instructions, when being executed by the processor, can implement the steps or functions in the facial acupoint locating method and/or the acupuncture method provided by the above method embodiments.

Those skilled in the art can understand that all or part of the processes of the above embodiment methods can be implemented by the computer programs to instruct related hardware (such as the processor and a controller), and the computer programs may be stored in the computer readable storage medium, where the computer readable storage medium is a disk, an optical disk, a read-only memory, a random memory, etc.

The facial acupoint locating method, the acupuncture method, the acupuncture robot and the storage medium provided by the present invention are introduced in detail above. The principle and implementations of the present invention are elaborated by applying specific examples herein. The descriptions of the above embodiments are only used to help understand the method and its core idea of the present invention. Meanwhile, according to the idea of the present invention, there will be changes in the specific implementations and the application scope to those skilled in the art. In summary, the content of the description should not be understood as a limitation to the present invention.

What is claimed is:

1. A facial acupoint locating method, comprising:

collecting an RGB image and a depth image of a face by using a depth camera, and generating three-dimensional point cloud data of the face based on the RGB image and the depth image;

inputting the three-dimensional point cloud data of the face into a trained face segmentation model to obtain a plurality of facial feature regions, wherein the plurality of the facial feature regions comprise eyebrow regions, eye regions, a nose region, and a mouth region; and acquiring an association relationship between the plurality of the facial feature regions and key acupoint points, and determining locations of the facial acupoints based on the association relationship and the plurality of the facial feature regions;

wherein the face segmentation model comprises a feature extraction module, a channel attention module, a spacial attention module, and a segmentation module;

the feature extraction module comprises a first multi-layer perceptron, a second multi-layer perceptron, a third multi-layer perceptron, a fourth multi-layer perceptron, a fifth multi-layer perceptron, a maximum pooling layer, and a feature concatenation layer which are sequentially connected and share a weight; and the inputting the three-dimensional point cloud data of the face into a trained face segmentation model to obtain a plurality of facial feature regions comprises:

inputting the three-dimensional point cloud data of the face into the feature extraction module to obtain facial features;

inputting the facial features into the channel attention module to obtain channel features;

inputting the channel features into the spacial attention module to obtain space-channel features; and inputting the space-channel features into the segmentation module to obtain the plurality of the facial feature regions, wherein each of the first multi-layer perceptron, the second multi-layer perceptron, the third multi-layer perceptron, the fourth multi-layer perceptron, and the fifth multi-layer perceptron comprises a convolutional layer, a batch normalization layer, and an activation function layer;

the first multi-layer perceptron is used for extracting features of a first scale of a three-dimensional point cloud of the face to obtain first-scale features;

the second multi-layer perceptron is used for extracting features of a second scale of the three-dimensional point cloud of the face to obtain second-scale features;

the third multi-layer perceptron is used for extracting features of a third scale of the three-dimensional point cloud of the face to obtain third-scale features;

the fourth multi-layer perceptron is used for extracting features of a fourth scale of the three-dimensional point cloud of the face to obtain fourth-scale features;

the fifth multi-layer perceptron is used for extracting features of a fifth scale of the three-dimensional point cloud of the face to obtain fifth-scale features;

the maximum pooling layer is used for performing maximum pooling on the fifth-scale features to obtain global features; and the feature concatenation layer is used for concatenation the first-scale features, the second-scale features, the third-scale features, the fourth-scale features, the fifth-scale features, and the global features to obtain the facial features.

2. The facial acupoint locating method according to claim 1, wherein the depth camera comprises an RGB video cam and a depth sensor; and the collecting an RGB image and a depth image of a face by using a depth camera, and generating three-dimensional point cloud data of the face based on the RGB image and the depth image comprise:

collecting the RGB image based on the RGB video cam;

collecting the depth image based on the depth sensor;

acquiring first camera parameters of the RGB video cam and second camera parameters of the depth sensor; and fusing the RGB image to the depth image based on the first camera parameters and the second camera parameters, to obtain the three-dimensional point cloud data of the face.

3. The facial acupoint locating method according to claim 1, wherein the segmentation module comprises a first segmentation unit, a second segmentation unit, a third segmentation unit, and a fourth segmentation unit which are sequentially connected, wherein
- each of the first segmentation unit and the second segmentation unit comprises a convolutional layer, a batch normalization layer, an activation function layer, and a dropout layer;
- the third segmentation unit comprises a convolutional layer, a batch normalization layer, and an activation function layer; and
- the fourth segmentation unit comprises a convolutional layer and a batch normalization layer.

4. The facial acupoint locating method according to claim 1, wherein the channel attention module comprises a channel maximum pooling layer and a channel average pooling layer which are parallel, as well as a channel multi-layer perceptron, a first channel activation function layer, a channel feature weighting layer, and a second channel activation function layer which are sequentially connected after the channel maximum pooling layer and the channel average pooling layer.

5. The facial acupoint locating method according to claim 1, wherein the spacial attention module comprises a space maximum pooling layer and a space average pooling layer which are parallel, as well as a spacial feature concatenation layer, a spacial convolutional layer, a spacial activation function layer, and a spacial feature weighting layer which are sequentially connected after the space maximum pooling layer and the space average pooling layer.

6. An acupuncture method, comprising:
- determining facial acupoints of a person to be acupunctured based on the facial acupoint locating method;
- acquiring symptoms of the person to be acupunctured, and determining a target acupoint in the facial acupoints based on the symptoms;
- acquiring an initial location of an acupuncture needle, and determining a planning path based on the initial location, the target acupoint and a preset path planning algorithm; and
- controlling the acupuncture needle to reach the facial acupoint along the planning path,
- wherein the facial acupoint locating method is that according to claim 1.

7. An acupuncture robot, comprising a storage and a processor, wherein
- the storage is used for storing programs; and
- the processor, coupled to the storage, is used for executing the programs stored in the storage, so as to implement the steps in the facial acupoint locating method according to claim 1.

8. A non-transitory computer readable storage medium, storing programs or instructions thereon, wherein the programs or the instructions, when being executed by the processor, implement the steps in the facial acupoint locating method according to claim 1.

* * * * *